United States Patent [19]

Belcher et al.

[11] 3,803,630

[45] Apr. 9, 1974

[54] APPARATUS FOR RECORDING AND REPRODUCING HANDWRITING

[75] Inventors: Donald K. Belcher, Springfield; Joe T. May, Fairfax, both of Va.

[73] Assignees: Signa-Signer Inc., Silver Spring, Md.; Enscon, Springfield, Va. ; part interest to each

[22] Filed: May 22, 1972

[21] Appl. No.: 255,788

[52] U.S. Cl. ....... 346/33 MC, 178/18, 179/100.2 S, 318/568, 346/74 M

[51] Int. Cl. ...................... G11b 31/00, B43k 29/00

[58] Field of Search ....... 346/33 MC; 318/568, 575, 318/606, 607; 179/100.2 S, 100.2 K; 178/18, 19

[56] References Cited

UNITED STATES PATENTS

| | | | |
|---|---|---|---|
| 2,807,797 | 9/1957 | Shoemaker | 179/100.2 K X |
| 3,425,140 | 2/1969 | Dillon et al. | 346/33 MC UX |
| 3,433,903 | 3/1969 | Murray et al. | 179/100.2 MD |
| 3,488,452 | 1/1970 | Gunning et al. | 179/100.2 S |

*Primary Examiner*—Joseph W. Hartary

*Attorney, Agent, or Firm*—John J. Byrne; Edward E. Dyson

[57] ABSTRACT

A system for accurately compensating for tape speed variations during recording and reproduction by utilizing a reference signal to generate an error correction signal to compensate for the variations during replay or reproduction.

9 Claims, 1 Drawing Figure

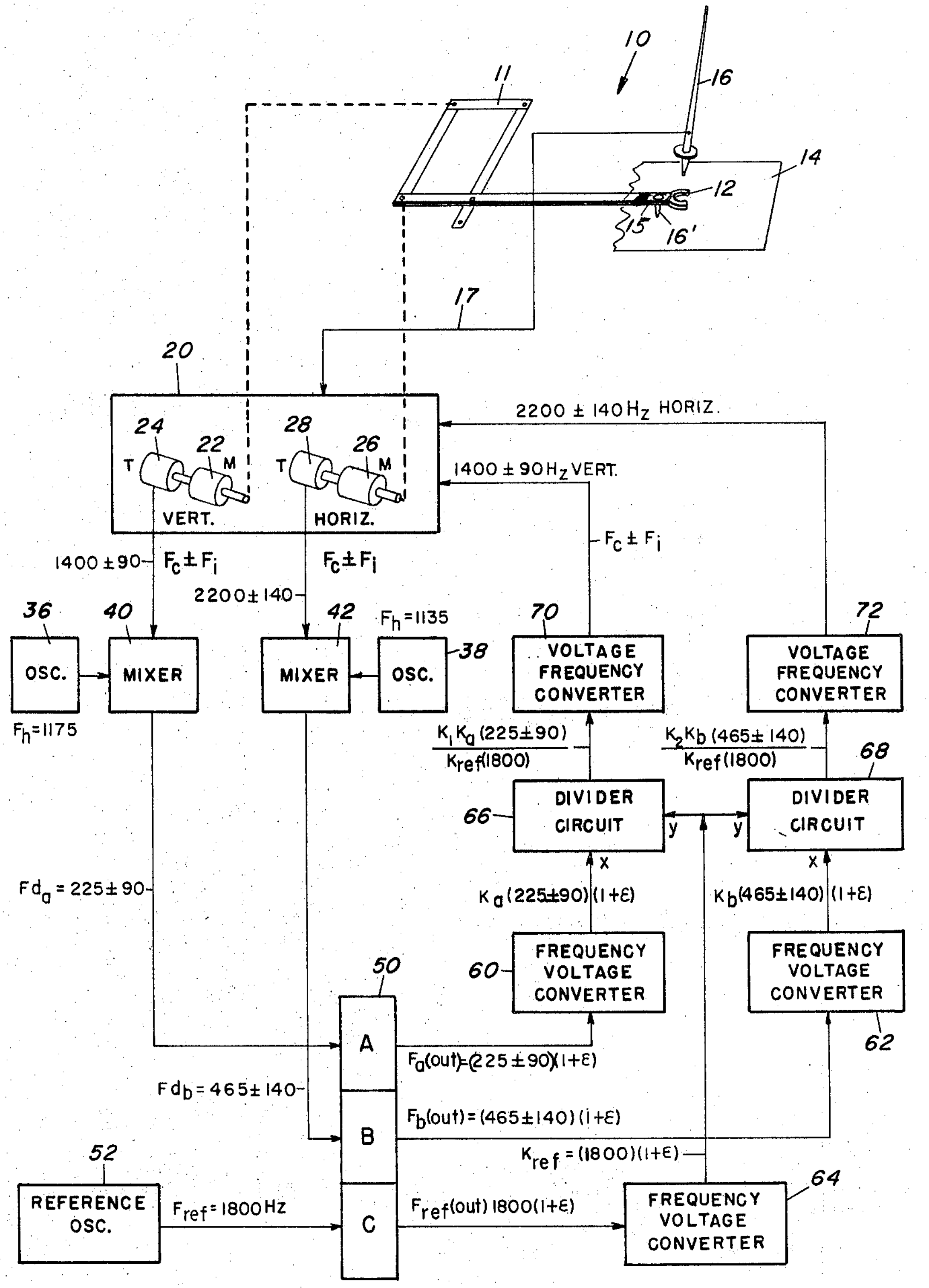
10
11
16
14
12
15
16'
17
20
2200 ± 140Hz HORIZ.
24
22
28
26
T
M
T
M
1400 ± 90Hz VERT.
VERT.
HORIZ.
$F_c \pm F_i$
1400±90
$F_c \pm F_i$
$F_c \pm F_i$
2200±140
36
40
42
$F_h$=1135
70
72
38
OSC.
MIXER
MIXER
OSC.
VOLTAGE FREQUENCY CONVERTER
VOLTAGE FREQUENCY CONVERTER
$F_h$=1175
$\frac{K_1 K_a (225\pm90)}{K_{ref}(1800)}$
$\frac{K_2 K_b (465\pm140)}{K_{ref}(1800)}$
68
66
DIVIDER CIRCUIT
DIVIDER CIRCUIT
y
y
x
x
$Fd_a$ = 225±90
$K_a(225\pm90)(1+\varepsilon)$
$K_b(465\pm140)(1+\varepsilon)$
50
60
FREQUENCY VOLTAGE CONVERTER
FREQUENCY VOLTAGE CONVERTER
62
A
$F_a(out)=(225\pm90)(1+\varepsilon)$
$Fd_b$ = 465±140
B
$F_b(out)=(465\pm140)(1+\varepsilon)$
$K_{ref}$ = (1800)(1+ε)
52
64
REFERENCE OSC.
$F_{ref}$= 1800Hz
C
$F_{ref}(out)$ 1800(1+ε)
FREQUENCY VOLTAGE CONVERTER

APPARATUS FOR RECORDING AND REPRODUCING HANDWRITING

In many instrument systems, information is oftentimes transferred in frequency moduation FM form. This information to be transferred is imposed on a basic frequency called a carrier frequency ($F_c$), by means of increasing or decreasing this carrier frequency in accordance with the information intelligence. Amplitude information is determined by carrier frequency change and frequency information is determined by the rate at which the carrier frequency information is determined by the rate at which the carrier frequency changes. The percentage carrier change is typically 10 percent or less of the basic carrier frequency.

Such information or intelligence is oftentimes recorded on analog magnetic tape for reporduction at a later time. In many instances, variations in the speed of the tape drive during the recording stage and in the later reproduction stage is not critical. In many other instances, especially where accurate mechanical reproductions of a mechanical input is desired, variations in tape speed can render the output substantially useless. In a typical recording instrument, tape speed variations are 5 percent and the carrier frequency deviation 6 percent. Because the tape speed variation also acts on the carrier frequency and on the imposed information, an amplitude error (which is 80 percent of the maximum information signal) can and usually does occur.

Many expensive apparatus and instruments overcome the variations in tape speed by accurately controlling capstan and tape controls. Historically these types of controls are delicate and expensive which makes them unavailable for many environments of use.

Particularly in apparatus for recording and reproducing handwriting is accurate intelligence transmission critical. Additionally, this equipment is used in office environments where the operators are oftentimes neither skilled nor careful. Therefor a particular objective of this invention is to provide a compensator for tape velocity variations in such equipment. In U.S. Pat. No. 3,582,956 issued to Houston et al. on June 1, 1971, there is described an apparatus for recording and reproducing handwriting. The improvements of the instant invention improves that invention by transmitting positional intelligence via frequency modes which, if compared with a reference signal, produces an error correction signal during reproduction to account for tape speed variations between recording and replay. Another principal objective of this invention is to provide a means for utilizing such a reference signal in apparatus of the type described.

A still further objective of this invention is to provide a means for recording positional frequency intelligence on a tape, comparing the same with an accurately produced reference frequency and, prior to replay, compensating for any variations in tape velocities which may exist by utilizing the reference frequency.

Another principle objective of this invention is to correct the above mentioned error by utilizing a frequency down-conversion during the recordation stage to reduce the effect of tape variations on the original information and to utilize the measurement of tape speed variation during reproduction to generate an error correction signal. The down-conversion frequencies are up-converted to regenerate the original frequency.

These and other objects of the invention will become more apparent to those skilled in the art by reference to the following detailed description when viewed in light of the accompanying drawing wherein the FIGURE is a partially diagrammatic, partially schematic block diagram showing the system of this invention.

Referring now to the drawing wherein like numerals indicate like parts, the numeral 10 generally indicates a linkage system supporting a pen element 12 for inscribing a signature or other intelligence on paper 14. The inscription is formed by moving a pen or stylus indicated by the numeral 16. A two-way transducer or transceiver system is indicated by the numeral 20. The first stage of the two-way transducer 20 includes a vertical servo motor 22 connected to a vertical position transformer 24, and a horizontal servo motor 26, used in association with a horizontal position transformer 28. The unit 20 is known in the prior art and the elements indicated by the numerals 22–28 are only a part thereof.

Transmission of data is accomplished by translating the motion of the transmitting stylus or pen 16 in a manner known to the prior art. Reproduction is accomplished by way of a pen 16' which can be moved out of position when writing with pen 16. By way of a mechanical linkage or pantograph 18, position intelligence is fed into units 22 and 26 from pen 16. As indicated on the block diagram the vertical carrier frequency can be 1,400 Hz and the horizontal carrier 2,200 Hz. Position changes transmitted through the pantograph will vary the carrier frequency ± 90 Hz in the vertical range and ± 140 Hz for the horizontal position. The output from the two-way transducer is indicated by $F_c$ (carrier frequencies) ± $F_i$ (position intelligence). In vertical positioning this is 1,400 Hz ± 90 Hz and for the horizontal positioning 2,200 Hz ± 140 Hz.

A pair of oscillators 36 and 38 are provided to transmit heterodyne frequencies of 1,175 Hz and 1,735 Hz respectively to mixers 40 and 42. The heterodyning frequencies are indicated by the symbol $F_h$. Out of the mixer is the signal $F_d$. This difference frequency $F_d$ will contain the same frequency deviation at the initial stages but a major portion of the carrier frequency has been removed. Although heterodyning is electrically a non-linear operation, it results in a frequency substraction (or addition). After the substraction the frequency $F_d$ is then recorded on a first track A of an analog magnetic recorder diagrammatically indicated by the numeral 50. The $F_d$ for the horizontal position is recorded on the track B thereof. The numeral 52 indicates a high stability oscillator producing a frequency on the order of 1,800 Hz $F_{ref}$. The $F_{ref}$ is recorded on a track C of the analog magnetic recording tape.

With appropriate controls, not forming a part of this invention, the tape is driven for reproduction of the signal. As previously described, the carrier frequencies are varied in a manner to indicate the position of pen 12. The carrier frequency, as varied, is mixed with heterodyning frequencies and is recorded on a magnetic medium such as tape 50 together with a reference frequency. The heterodyning maximizes the positional intelligence with respect to the carrier frequency which eases the requirements of the reproduction circuitry hereinafter described.

During reproduction or replay, the intelligence on recording medium 50 from track A $F_{a(out)}$ is fed to a frequency-voltage converter 60. Frequency intelligence from track B $F_{b(out)}$ is fed to the frequency voltage converter 62. The reference frequency from track C $F_{ref\,(out)}$ is fed to the frequency voltage converter 64.

The converters 60 and 62 are of a type which make the following conversion: $V$ out$=KF$ in where $V$ is the output voltage and $F$ is the input frequency and $K$ is the converter constant. This results in a value of $K_a(225\pm90)\,(1+\epsilon)$ for track $A$ and $K_b(465\pm140)\,(1+\epsilon)$ where $K_a$ and $K_b$ are the respective frequency to voltage converter constants, and $\epsilon$ is the amount of frequency variation commonly called "wow and flutter" due to the combined recorder speed change encountered during replay and record. The converter 64 results in an output voltage of $K_{ref}(1800)\,(1+\epsilon)$ where $K_{ref}$ is the frequency to voltage converter constant for track C.

The demodulated output of track C (from 64) is fed to dividers 66 and 68. The dividers effect an analog division which results in an output voltage in the form of $(kx/y)$ where $x$ is the dividend input, $y$ is the divisor input, and $k$ is the constant or scale factor of the divider circuit.

In the case of track A, $x$ is the voltage $K_a(225\pm90)\,(1+\epsilon)$, $y$ is the voltage $K_{ref}(1800)\,(1+\epsilon)$ and the output of the divider is $K_1K_a(225\pm90)/K_{ref}(1800)$. $K_1$ is the divider scale factor. Notice that all voltage variations due to "wow and flutter" have been totally eliminated leaving only the original information with constants $K_1$, $K_a$, $K_{ref}$, and 1,800.

In the case of track B, $x$ is the voltage $K_b(465\pm140)\,(1+\epsilon)$, $y$ is the voltage $K_{ref}(1800)\,(1+\epsilon)$ and output of divider is $K_2K_b(465\pm140)/K_{ref}(1800)$. $K_2$ is the B-channel divider scale factor. As before, all "wow and flutter" components have been eliminated, yielding the original information modified by the constants $K_b$, $K_{ref}$, 1800, and $K_2$.

The output voltage from divider unit 66 is fed to the voltage to frequency converter 70 which results in an output frequency of 1400±90 Hz. This is done by selecting the appropriate scale factor and bias point for these voltage to frequency converters. The output voltage from divider unit 68 is fed to the voltage to frequency converter 72 which results in a output frequency 2,200 Hz ± 140 Hz. Again the scale factor and bias points of the converter are properly adjusted for this result.

At this point the original frequencies are accurately reproduced with no distortions resulting from tape speed changes. A corrected frequency value is then fed back to the two-way transducer 20 so as to drive pen 12 accurately when compared with the original inscription made by it.

The functions of frequency-to-voltage converters 60, 62 and 64, divider circuits 66 and 68, and voltage-to-frequency converters 70 and 72 can be accomplished by conventional analog electronic circuitry of the sort generally known to those of ordinary skill in the art.

In a general manner, while there has been disclosed an effective and efficient embodiment of the invention, it should be well understood that the invention is not limited to such an embodiment as there might be changes made in the arrangement, disposition and form of the parts without departing from the principle of the present invention as comprehended within the scope of the accompanying claims.

We claim:

1. In a system for reproducing the path of a mechanical element including recording means for recording the vertical and horizontal positional information of the element as a modulation of a carrier frequency thereby producing a plurality of positional frequencies $F_a$ and $F_b$, transducer means for responding to said positional frequencies and for driving said element along said path, the improvement comprising, said recording means including a plurality of channels A, B, and C (ref) adapted to simultaneously record positional frequencies $F_a$ and $F_b$ and a fixed reference frequency $F_{ref}$, respectively, said recording means including a readout means for reproducing the recorded frequencies, said recording means introducing a wow and flutter component $(1+e)$ into said recorded frequencies, thereby producing a plurality of output frequencies $F_a(1+e)$, $F_b(1+e)$, and $F_{ref}(1+e)$, a plurality of frequency-to-voltage converters connected to said plurality of channels for converting $F_a(1+e)$, $F_b(1+e)$, and $F_{ref}(1+e)$ into proportional voltages $K_a(F_a)\,(1+e)$, $K_b\,(F_b)\,(1+e)$, and $K_{ref}\,(F_{ref})\,(1+e)$, respectively, a plurality of voltage dividing circuits connected to said frequency-to-voltage converters for producing voltage quotients $K_1K_a(F_a)/K_{ref}(F_{ref})$ and $K_2K_b(F_b)/K_{ref}(F_{ref})$ proportional to the ratios of $K_a(F_a)\,(1+e)/K_{ref}(F_{ref})\,(1+e)$ and $K_b(F_b)\,(1+e)/K_{ref}(F_{ref})\,(1+e)$, respectively, a plurality of voltage-to-frequency converters connected to said voltage dividing circuits for transforming said quotients $K_1K_a(F_a)/K_{ref}(F_{ref})$ and $K_2K_b(F_b)/K_{ref}(F_{ref})$ into positional frequencies $F_a$ and $F_b$ substantially free of said wow and flutter component $(1+e)$ introduced by said recording means, and means connected to said voltage-to-frequency converters for feeding said positional frequencies $F_a$ and $F_b$ to said transducer whereby the path of said element can be accurately reproduced.

2. The system of claim 1 wherein said positional frequencies $F_a$ and $F_b$ are heterodyne prior to the recordation thereof.

3. The invention of claim 1 wherein said element is a pen.

4. The invention of claim 1 wherein said recording means includes a driven tape having a means to accept a plurality of frequency information.

5. The system of claim 1 wherein $k_1$ may be any real number including 1.

6. The system of claim 1 wherein $K_2$ may be any real number including 1.

7. The system of claim 1 wherein $K_a$ may be any real number including 1.

8. The system of claim 1 wherein $K_b$ may be any real numer including 1.

9. The system of claim 1 wherein $K_{ref}$ may be any real number including 1.

* * * * *